United States Patent
Knish et al.

(10) Patent No.: US 6,617,827 B2
(45) Date of Patent: Sep. 9, 2003

(54) BATTERY CHARGER WITH SEQUENTIAL CHARGING

(75) Inventors: George Knish, Mead, CO (US); David E. Werner, Boulder, CO (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/916,376

(22) Filed: Jul. 26, 2001

(65) Prior Publication Data

US 2003/0020433 A1 Jan. 30, 2003

(51) Int. Cl.$^7$ ............................................... H02J 7/00
(52) U.S. Cl. ....................................................... 320/121
(58) Field of Search ................................. 320/121, 115, 320/116, 125, 132; 307/66

(56) References Cited

U.S. PATENT DOCUMENTS

| | | | |
|---|---|---|---|
| 5,028,859 A | | 7/1991 | Johnson et al. ............. 320/125 |
| 5,367,556 A | | 11/1994 | Marui et al. ............. 455/569.2 |
| 5,659,236 A | * | 8/1997 | Hahn ......................... 320/115 |
| 5,998,966 A | | 12/1999 | Gaza ......................... 320/125 |
| 6,049,192 A | * | 4/2000 | Kfoury et al. ............... 320/115 |
| 6,111,389 A | * | 8/2000 | Aranovich et al. .......... 320/150 |
| 6,167,289 A | * | 12/2000 | Ball et al. .................... 455/572 |
| 6,300,743 B1 | * | 10/2001 | Patino et al. ............... 320/106 |
| 6,356,054 B1 | * | 3/2002 | Herrmann .................. 320/115 |

FOREIGN PATENT DOCUMENTS

| | | | |
|---|---|---|---|
| GB | 2242794 | 10/1991 | ............ H02J/7/00 |
| GB | 2292051 | 2/1996 | ............ H04Q/7/32 |
| GB | 2325591 | 11/1998 | ............ H04Q/7/32 |
| WO | 9943095 | 8/1999 | ............ H04B/1/38 |

* cited by examiner

Primary Examiner—Edward H. Tso
Assistant Examiner—Pia Tibbits
(74) Attorney, Agent, or Firm—Philip F. Wadsworth; Charles D. Brown; Nicholas J. Pauley (57) ABSTRACT

The battery charging process monitors the battery charging pockets waiting for an indication that a battery or a phone-battery combination has been inserted into their respective pockets. The first battery that is inserted is the high priority battery and is charged first while any subsequent battery inserted into a charging pocket has no power applied until the high priority battery is charged. If the phone enters a call while in the charger, it becomes the high priority battery if it was not already. In this case, power is removed from the individual battery and applied to the phone-battery combination until the call has been completed. At this point, the process returns the high priority status to the battery that had it prior to the call interrupt.

5 Claims, 7 Drawing Sheets

BATTERY CHARGER WITH SEQUENTIAL CHARGING

BACKGROUND OF THE INVENTION

1. Field of the Invention

The present invention relates generally to battery charging. Particularly, the present invention relates to the sequential charging of batteries.

2. Description of the Related Art

Battery chargers that accept multiple batteries typically charge each battery at a high rate of charge. This requires the power circuits of the battery charger to be large enough to handle the power required to fast charge more than one battery.

Size and weight can be a consideration when a consumer decides to purchase a battery charger. For example, the consumer may want the charger for travel purposes and would therefore like the charger to be as small and light as possible. However, the multiple battery chargers are popular since consumers typically travel with more than one battery in order to have a fully charged battery ready when the other battery is discharged. There is a resulting need for a battery charger that has the capability for charging multiple batteries while maintaining a light weight and small size.

SUMMARY OF THE INVENTION

The present invention encompasses a process for sequentially charging a plurality of batteries in a battery charger. The high priority battery is first set by determining which battery was inserted first. The high priority battery is charged before any other battery. Once the high priority battery is charged, the next battery that was inserted is charged while power to the other batteries is removed.

In the preferred embodiment, one of the batteries is coupled to a mobile station, such as a phone. If the phone is in a call, the phone now has priority. In this case, power is removed from the other battery while the phone is powered. Once the call ends, priority passes back to the battery that had priority before the call was detected.

DETAILED DESCRIPTION OF THE PREFERRED EMBODIMENT

The present invention provides a battery charger with the capability for charging multiple batteries while maintaining a light weight and a small size. This is accomplished by sequentially charging the batteries in the order in which they are placed in the pockets of the battery charger.

Figure 1:
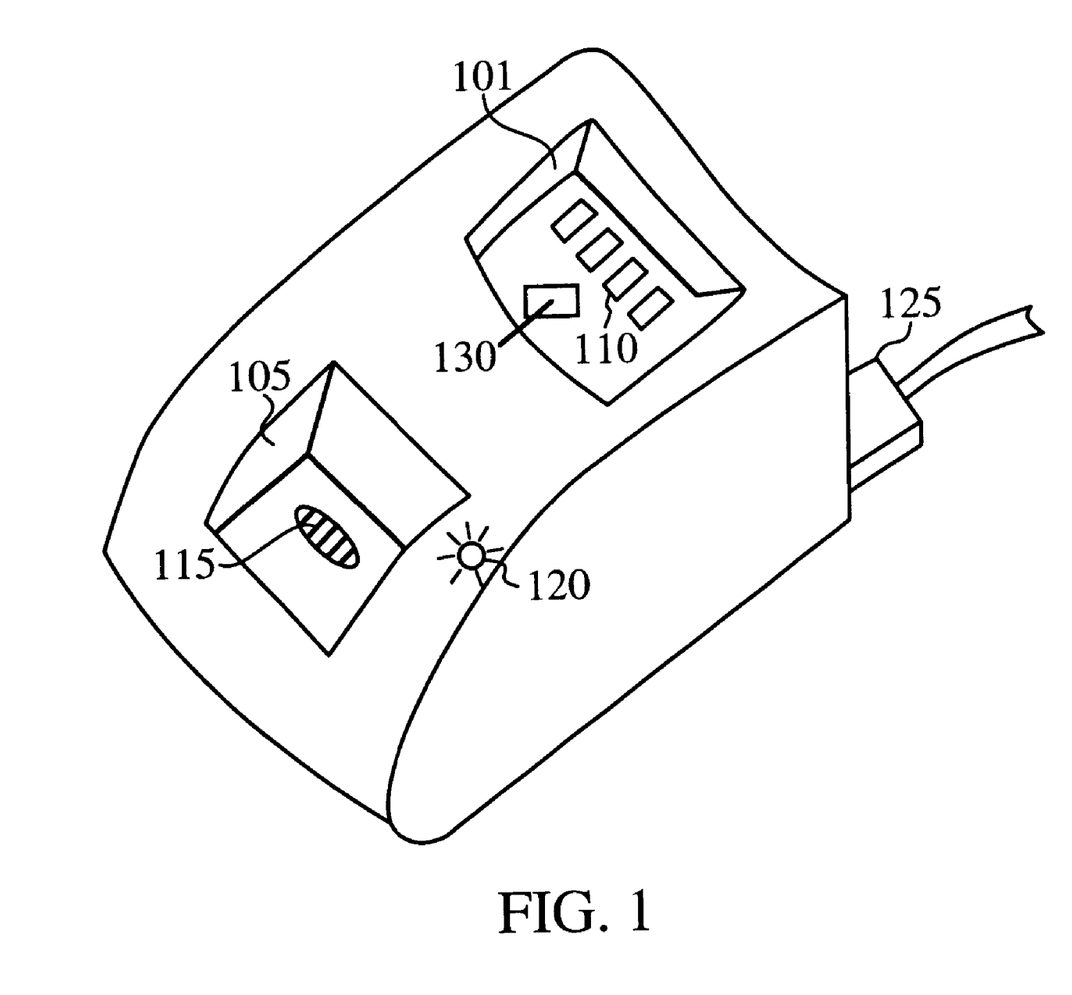
FIG. 1 shows a perspective view of a dual pocket battery charger of the present invention.

FIG. 1 illustrates the battery charger of the present invention. The battery charger is comprised of two pockets (101 and 105). The first pocket (101) holds and charges an individual battery. This pocket is comprised of a plurality of contacts (110) that mate with the contacts on the individual battery. These contacts provide the charging current required to charge the battery. Additionally, a temperature sensor 130 may be used to determine the temperature of battery inserted into pocket 101.

The second pocket (105) accepts and charges a battery coupled to a phone. In the preferred embodiment, this pocket (105) comprises a connector (115) that mates with the phone's connector. This connector (115) provides the charging current required to charge the battery while coupled to the phone. The connector (115) may also provide power to the phone while it is in a call.

An LED (120) provides an indication of charging status. In the preferred embodiment, the LED (120) is capable of radiating different colors (e.g., red, green) in order to provide various indications of status.

A power plug (125) is inserted in the battery-charging unit to provide power to the batteries for charging or powering the phone. In the preferred embodiment, this power plug (125) is also capable of acting separately as a travel charger for the phone while away from the battery charger.

Figure 2:
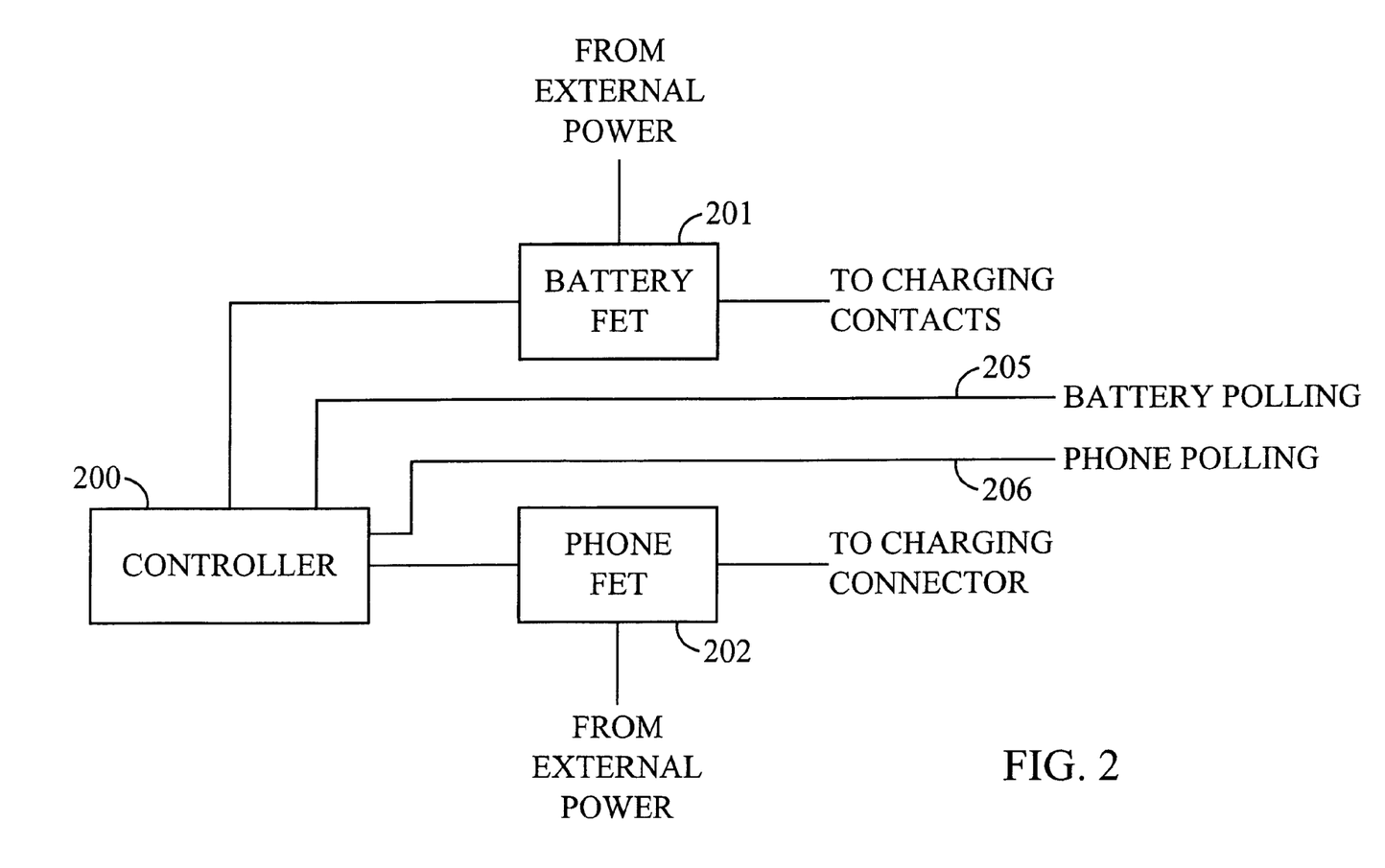
FIG. 2 shows a block diagram of the dual pocket battery charger in accordance with FIG. 1.

FIG. 2 illustrates a block diagram of the battery charger of the present invention. A controller (200) controls the battery charger and performs the processes of the present invention. This controller (200) may be a microprocessor or a microcontroller.

Two field effect transistors (FET) (201 and 202) switch power to the battery pocket charging contacts and the phone pocket charging connector. The battery FET (201) is coupled to both the controller (200) and external power. Likewise, the phone FET (202) is coupled to the controller (200) and external power. The controller (200) turns either FET (201 or 202) on/off such that the external power is routed to the battery charging contacts or the phone charging connector. The controller (200) turns on the FETs (201 or 202) in response to the processes of the present invention that are described subsequently.

The controller (200) is also coupled to the battery charging contacts and the phone charging connector through the polling lines (205 and 206). These signals provide the controller with the ability to monitor the charging condition of the batteries and to determine when the phone is indicating a call. While there are only two such polling lines (205 and 206) indicated in FIG. 2, alternate embodiments may use more than two lines for these functions.

The subsequent discussions of the processes of the present invention use the terms phone and battery. Unless otherwise noted, the term phone applies to a phone/battery combination since this is what will be inserted into the phone pocket.

Figure 3:
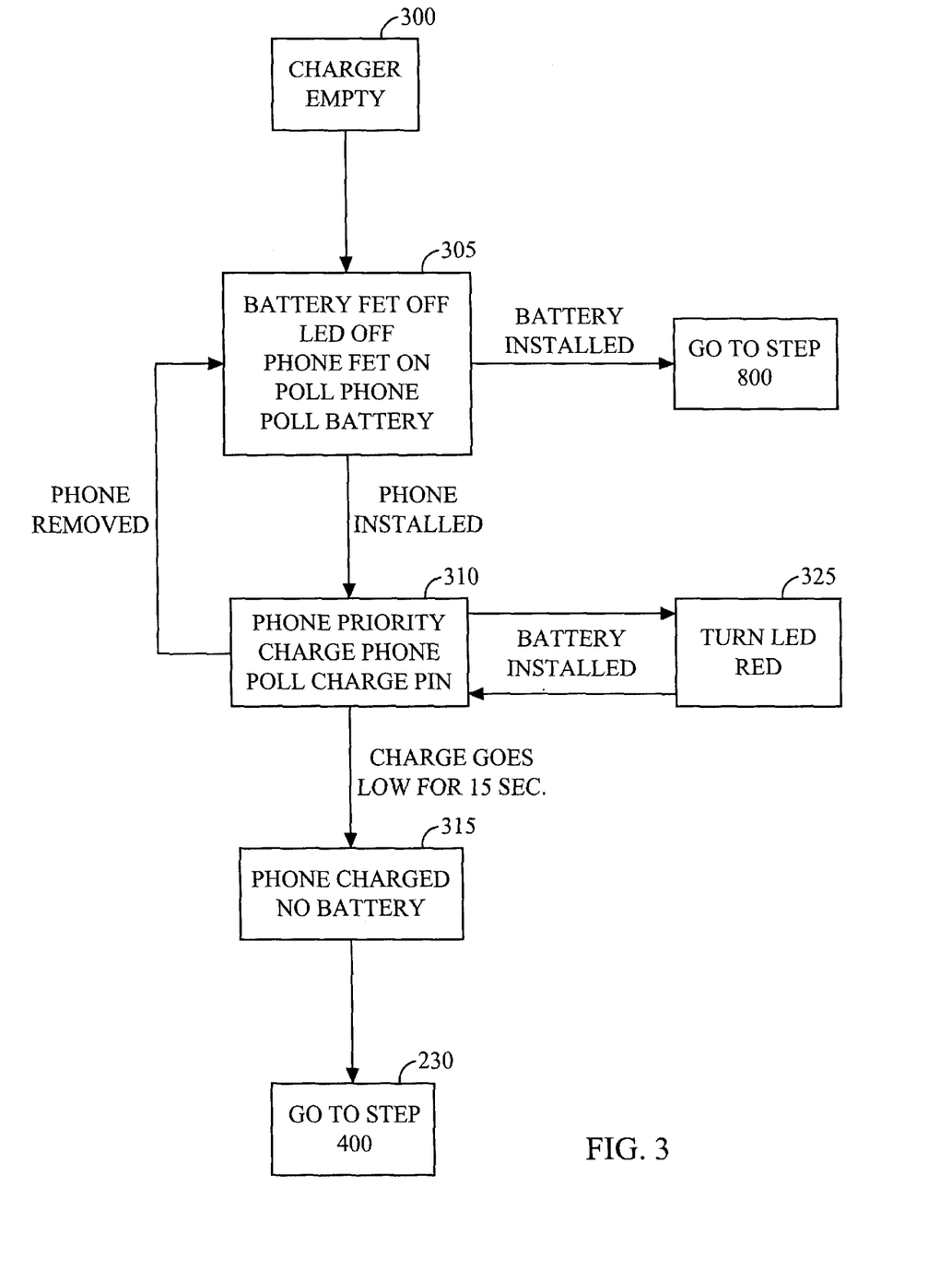
FIG. 3 shows a flowchart of a battery charging process of the present invention in which the battery charger is initially empty.

FIG. 3 illustrates a battery charging process of the present invention. The process begins with both pockets of the charger being empty (step 300). The battery FET is initially turned off, the status LED is turned off, and the phone FET is turned on (step 305). The phone FET is turned on first in order to apply enough initial charge to an inserted phone's completely dead battery so that it can produce a battery charge indication to the charger.

The controller then polls the phone and the battery contacts to determine if either the phone or the battery have been placed in their respective pockets (step 305). During the polling, in the preferred embodiment, the controller is looking for a voltage on one of the phone's connector pins that indicates the presence of the phone. The polling detects a battery in the battery pocket by examining identification contacts that provide a resistance value that is read by the controller. The polling continues until either the battery or the phone is detected.

If the phone has been installed first, the phone now has priority for charging (step 310). Since the previous step has already turned on the phone FET, the charging current has already been applied to the phone's charging contacts. If the phone is removed during this step (step 310), the process returns to the previous step (step 305) to scan for the insertion of either the phone or the battery. Otherwise, the phone continues to charge while the controller polls the phone's charge pin to determine when the phone is properly charged. In the preferred embodiment, the charge pin provides a logic low for more than 15 seconds to indicate that the phone has been properly charged (step 315). The phone can, when required, force the charge pin to a logic high to indicate that charging is required. At this point in the process, the battery has still not been detected and the process then continues to step 400 that is illustrated in FIG. 4 and described subsequently.

Figure 8:
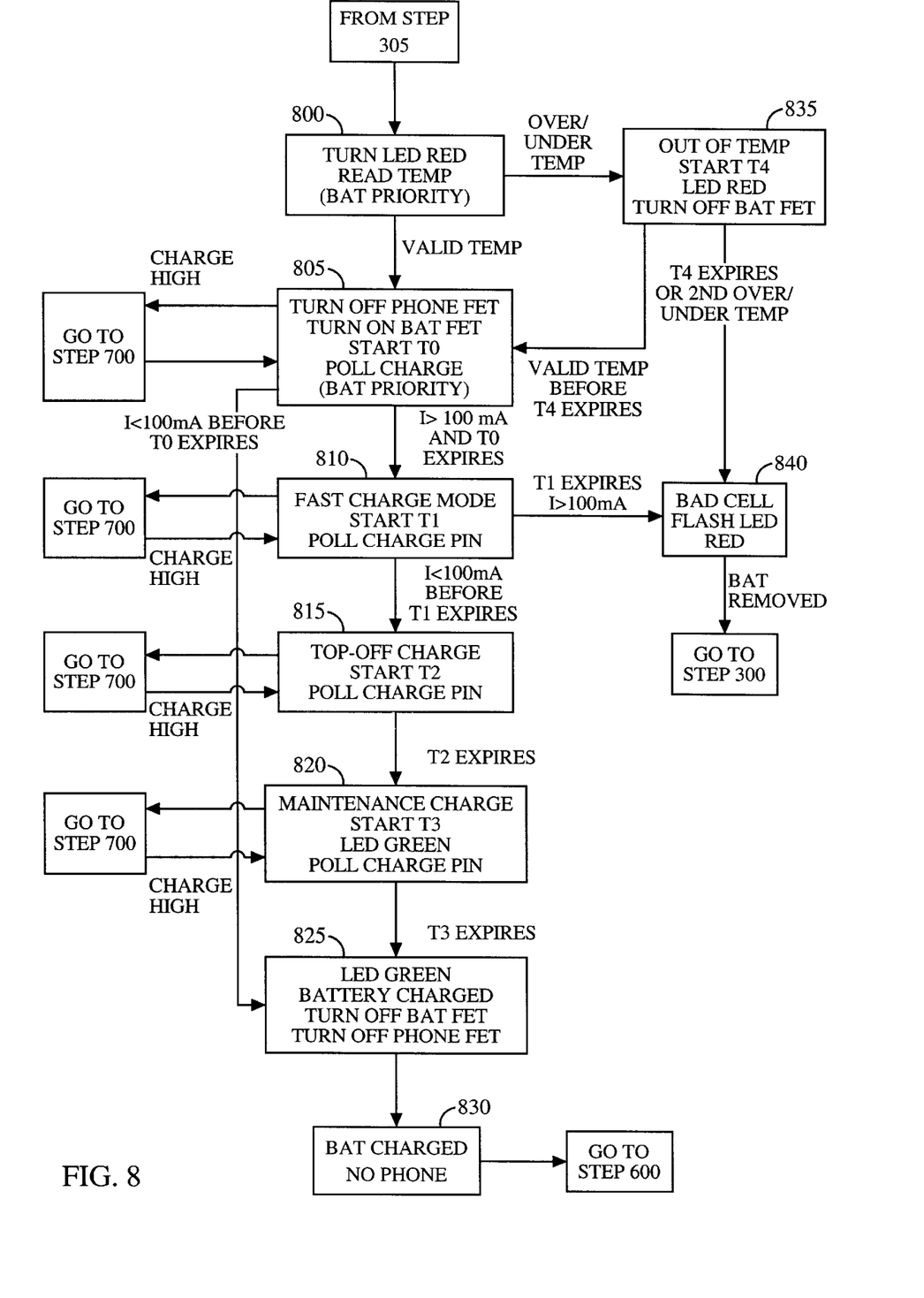
FIG. 8 shows a continuation of the battery charging process of FIG. 3 after the battery is installed in the battery charger.

If the battery is installed first during the initial polling step (step 305), the process continues to step 800 of the battery charging process that is illustrated in FIG. 8. If the battery is installed while the phone is charging (step 310), the status LED is turned red (step 325) to indicate that the battery is installed properly. No power is applied to the battery at this point since the phone has priority and a still being charged.

Figure 4:
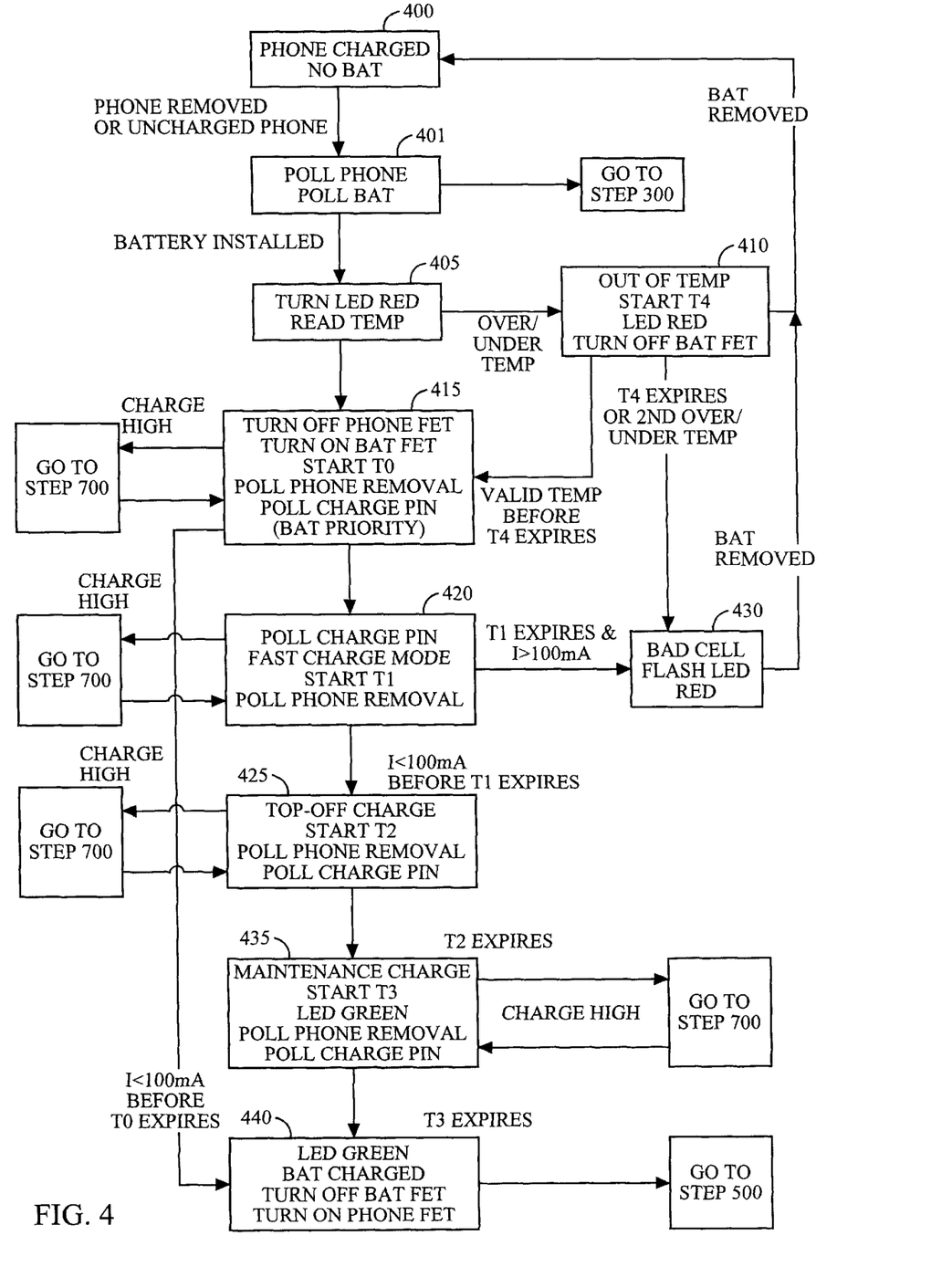
FIG. 4 shows a battery charging process of the present invention in which the phone is charged.

Referring to the process illustrated in FIG. 4, the process starts with the phone already charged and no battery in the battery pocket (step 400). The phone and the battery contacts are polled to determine if a battery has been inserted into the battery pocket or the charged phone has been replaced with an uncharged phone (step 401). If the phone is removed or an uncharged phone is placed in the phone pocket the process returns to step 300 of the charging process illustrated in FIG. 3.

If a battery has been inserted into the battery pocket of the charger, the LED is set to red (step 405). Additionally, the temperature of the battery is checked (step 405) to determine if the battery is over or under a preferred temperature range. If the temperature is greater than a maximum threshold temperature or less than a minimum threshold temperature the battery is considered to be out of the temperature range of the battery. In the preferred embodiment, the battery is considered normal if it is in the temperature range of 5° C. to 45° C. Anything above or below this range is considered to be suspicious and further checking is required. Alternate embodiments use other temperature ranges depending on the battery technology.

If the battery is outside the preferred temperature range, a timer designated T4 is started, the LED is turned red, and the battery FET is turned off (step 410). The timer, T4, is used to give the battery time to cool down or heat up to the preferred operating temperature range. In the preferred embodiment, T4 is set to 42 minutes. Alternate embodiments use other time intervals. If the battery has not reached the preferred operating temperature range before the time interval T4 has expired the battery cell is considered to be defective and the LED will flash red (step 430).

The battery temperature is monitored throughout the battery charging process, if the battery is measured to be out of the acceptable temperature range for a second time during the charge process, then the battery cell is considered to be defective and the LED will flash red (step 430). If the battery is removed during either step 430 or step 410, the process returns to the initial step of the phone being charged in no battery being present (step 400).

If the battery's temperature during time T4 reaches the preferred operating temperature range or the battery initially started in the preferred operating temperature range, the phone FET is turned off and the battery FET is turned on (step 415). This allows for charging of the battery individually while no power is being applied to the phone. The battery now has priority for charging over the phone.

Another timer, designated T0, in combination with the decrease in charging current of the battery are used to determine if the battery has already been charged (step 415). In the preferred embodiment, T0 is set to 2 minutes. It is known that the charge current of a fully charged battery will decrease at a faster rate than a battery that is not fully charged. Therefore, if the charge current is checked while T0 is running and it is determined that the current is less than 100 mA before T0 expires, the battery is fully charged and the process proceeds to step 440. If the battery is fully charged, the LED is turned green, the battery FET is turned off, and the phone FET is turned on (step 440). green, the battery FET is turned off, and the phone FET is turned on (step 440).

Both the phone and the battery charge pin are continually polled at this time to determine if the phone has been removed and when the battery charge pin indicates a charge (step 415). Since the battery has not yet indicated a full charge, the charger enters the fast charge mode (step 420). In this mode, the charger is supplying a greater amount of current to the battery in order to charge it rapidly.

Timer T1 is started at this point in order to determine the battery's condition. If T1 expires and the charge current is still greater than 100 mA, the battery is considered defective (step 430) and the red LED is flashed to indicate the defective battery cell. In the preferred embodiment, T1 is set to 8 hours. Alternate embodiments use other durations. If the battery is defective and is removed at this point, the process returns to step 400.

If the battery's charge current drops below 100 mA before T1 expires, the battery is good and the charge is approaching a full charge. In this case, a top-off charge is required (step 425). The top-off charge is a decrease in the charging current to a level lower than the fast charge rate. In the preferred embodiment, the top-off charge rate is less than 100 mA. Alternate embodiments use other charge rates.

Timer T2 is then started so that the battery is charged at the top-off rate for time T2 (step 425). In the preferred, embodiment, T2 is one hour. After T2 expires, the charger further reduces its charging rate to a maintenance charge (step 435) and the LED is turned green to indicate that the battery is fully charged. The maintenance charging rate is performed for time T3. In the preferred embodiment, T3 is also one hour.

After time T3 has expired, the battery is considered fully charged. The battery FET is turned off and the phone FET is turned on (step 440). The process then continues with step 500 illustrated in FIG. 5 and described subsequently.

During the previous four steps (steps 415, 420, 425, and 435) the phone was polled to determine if it was removed at any time. The polling also checked a call indication signal on the phone's connector. When this indication signal is a logical high, the phone is in a call and now has priority over the battery charging process described in FIG. 4. If the phone call is detected, the process continues to step 700 illustrated in FIG. 7 that describes a phone powering process after call detection.

Figure 7:
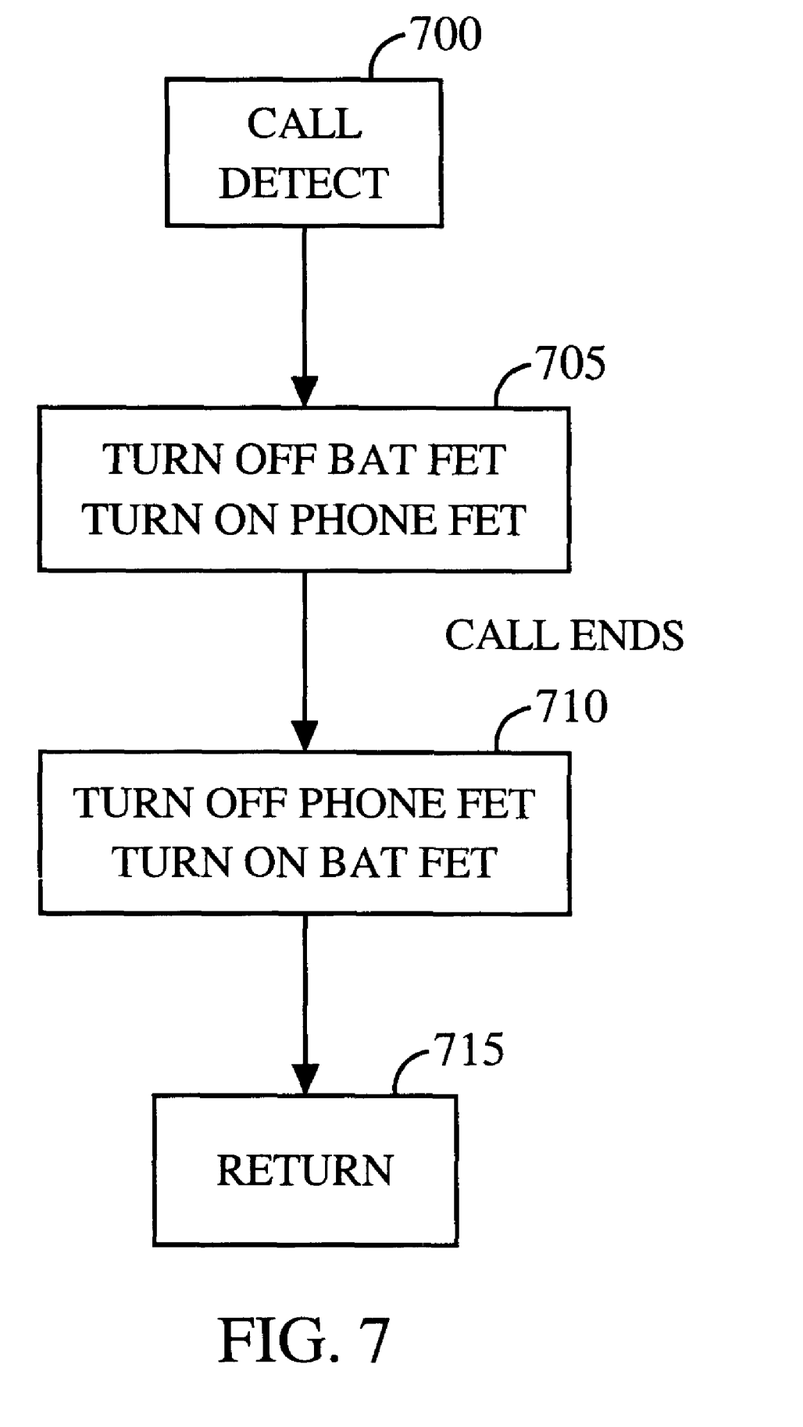
FIG. 7 shows a battery charging process of the present invention in which a call is detected while the phone is present in the charger.

Referring to FIG. 7, the call is detected (step 700) by the call indication signal on the phone's connector. Since the phone now has priority, the battery FET is turned off and the phone FET is turned on (step 705). Charging of the phone's battery does not occur during the call. Once the call indication on the phone goes low, the phone is no longer in the call. In this case, priority goes back to the battery so the phone FET is turned off and the battery FET is turned on (step 710). The process then returns (step 715) to the calling step.

Figure 5:
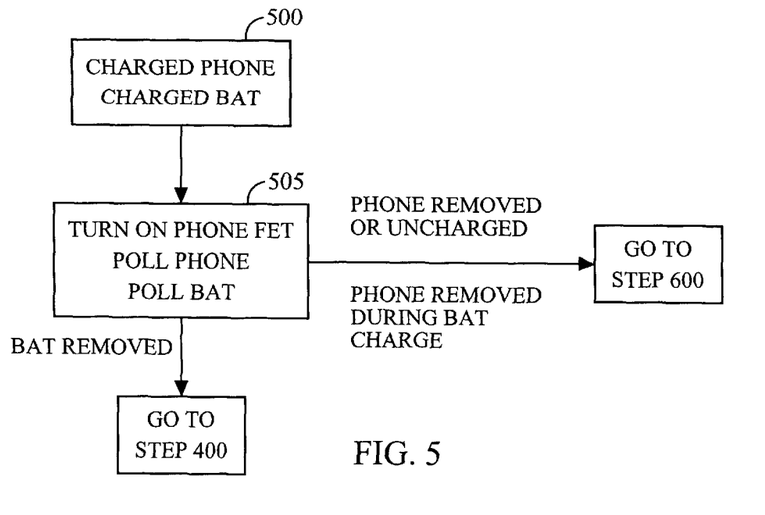
FIG. 5 shows a battery charging process of the present invention in which both the phone and battery are initially charged.

FIG. 5 illustrates the charging process when both the phone and battery have been fully charged (step 500). In this case, the phone FET is turned on in order to provide a maintenance charge to the phone (step 505). Additionally, both the phone and the battery are polled until either one has been removed (step 505). If the phone has been removed, the process continues at step 600 illustrated in FIG. 6. If the battery has been removed, the process continues at step 400 illustrated in FIG. 4.

Figure 6:
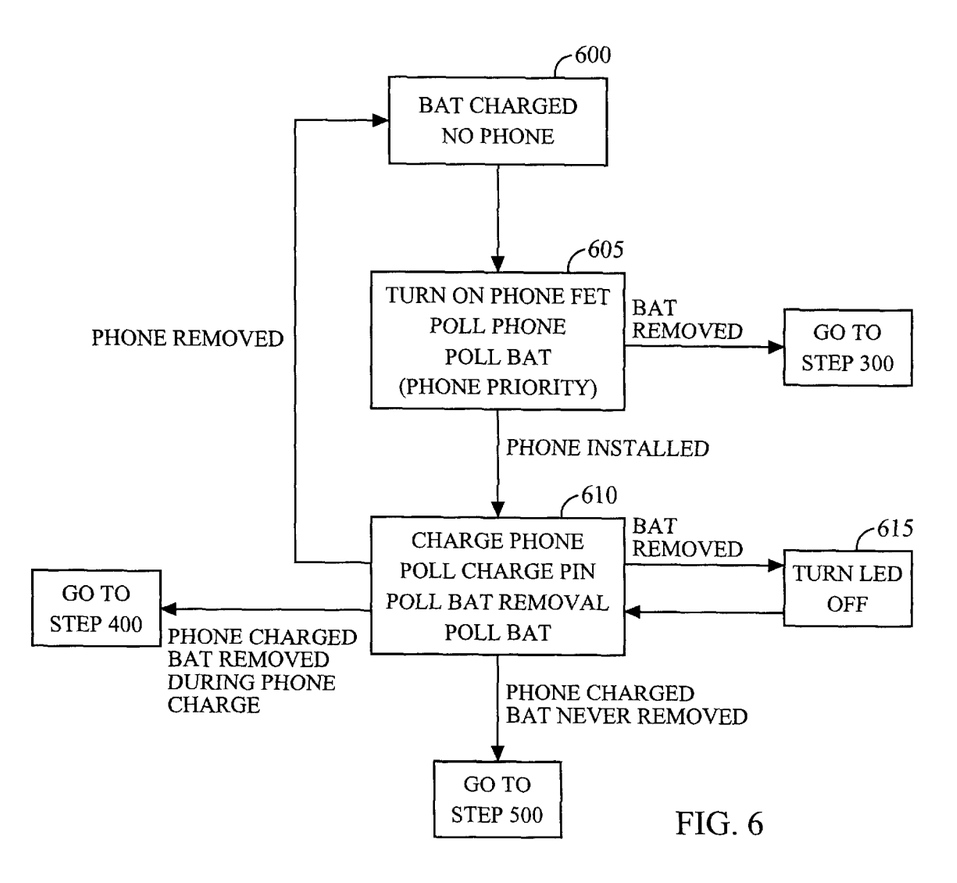
FIG. 6 shows a battery charging process of the present invention in which the battery is initially charged in the phone is not present.

FIG. 6 illustrates the charging process where the battery is charged and there is no phone in the phone charging pocket (step 600). In this case, the phone FET is turned on and both the phone and battery contacts are polled (step 605) until the situation changes. Since the battery is already charged, any uncharged phone placed in the phone pocket has priority for charging.

If the battery is removed during the polling process (step 605), the process returns to step 300 of the charging process of FIG. 3. If a phone is installed during the polling process, the phone is charged (step 610). At this point the charge pin on the phone and the battery are polled until the situation changes (step 610). If during his polling process the battery is removed, the LED is turned off (step 615) to indicate the battery's removal and the process returns to step 610.

If it is determined during the polling process of the charge pin that the phone has been charged and that the battery has been removed during the phone charge, the process continues with step 400 of the charging process illustrated in FIG. 4. If the phone has been charged and the battery has not been removed, the process continues with step 500 of the charging process illustrated in FIG. 5.

FIG. 8 illustrates the battery charging process in which the battery has priority. This process is a continuation from step 305 of FIG. 3.

Referring to the process illustrated in FIG. 8, the process starts with no phone in the phone charging pocket and a battery in the battery pocket (step 400). The LED is turned red and the battery's temperature is checked (step 800).

If the temperature is greater than the maximum threshold temperature or less than the minimum threshold temperature the battery is considered to be out of the temperature range of the battery. As in the process of FIG. 4, the battery is considered normal if it is in the temperature range of 5° C. to 45° C. Anything above or below this range is considered to be suspicious and further checking is required. Alternate embodiments use other temperature ranges depending on the battery technology.

If the battery is outside the preferred temperature range, timer T4 is started, the LED is turned red, and the battery FET is turned off (step 835). Time T4 is used to give the battery time to cool down or heat up to the preferred operating temperature range. In the preferred embodiment, T4 is set to 42 minutes. Alternate embodiments use other time intervals.

If the battery has not reached the preferred operating temperature range before the time interval T4 has expired the battery cell is considered to be defective and the LED will flash red (step 840). The battery temperature is monitored throughout the charging process, if the battery is measured to be out of the acceptable temperature range for a second time during the charge process, then the battery cell is considered to be defective and the LED will flash red (step 430). If the battery is removed at this point, the process continues at step 300 of FIG. 3.

If the battery's temperature during time T4 reaches the preferred operating temperature range or the battery initially started in the preferred operating temperature range, the phone FET is turned off and the battery FET is turned on (step 805). This allows for charging of the battery individually while no power is being applied to the phone. The battery now has priority for charging over the phone.

Timer T0 is used in combination with the decrease in charging current of the battery to determine if the battery has already been charged (step 805). In the preferred embodiment, T0 is set to 2 minutes. It is known that the charge current of a fully charged battery will decrease at a faster rate than a battery that is not fully charged. Therefore, if the charge current is checked while T0 is running and it is k determined that the current is less than 100 mA before T0 expires, the battery is fully charged and the process proceeds to step 825. If the battery is fully charged, the LED is turned green, the battery FET is turned off, and the phone FET is turned off (step 825). At this point, the battery is charged and there is still no phone detected (step 830).

If the battery charge current is more than 100 mA when T0 expires, then the battery is not fully charged (step 805). Since the battery has not yet indicated a full charge, the charger enters the fast charge mode (step 810). In this mode, the charger is supplying a greater amount of current to the battery in order to charge it rapidly. In the preferred embodiment, this charge level is initially around 900 mA. Alternate embodiments use other charge levels.

Timer T1 is started at this point in order to determine the battery's condition. If T1 expires and the charge current is still greater than 100 mA, the battery is considered defective (step 840) and the red LED is flashed to indicate the defective battery cell. In the preferred embodiment, T1 is set to 8 hours. Alternate embodiments use other durations. If the battery is removed at this point, the process continues with step 300 illustrated in FIG. 3.

If the battery's discharge current drops below 100 mA before T1 expires, the battery is good and the charge is approaching a full charge. In this case, a top-off charge is required (step 815). The top-off charge is a decrease in the charging current to a level lower than the fast charge rate. In the preferred embodiment, the top-off charge rate is less than 100 mA. Alternate embodiments use other charge rates.

Timer T2 is then started so that the battery is charged at the top-off rate for time T2 (step 815). In the preferred, embodiment, T2 is one hour. After T2 expires, the charger further reduces its charging rate to a maintenance charge (step 820) and the LED is turned green to indicate that the battery is fully charged. The maintenance charging rate is performed for time T3. In the preferred embodiment, T3 is also one hour.

After time T3 has expired, the battery is considered fully charged. The battery FET is turned off and the phone FET is turned off (step 825). The process then continues with the battery charged and no phone in the phone charging pocket (step 830). The process then continues with step 600 of FIG. 6.

During the previous four steps (steps 805, 810, 815, and 820) the phone was polled to determine if the call indication signal on the phone's connector indicated a call in progress. If the phone is in a call, it now has priority over the battery charging process described in FIG. 8. When the phone call is detected, the process continues to step 700 illustrated in FIG. 7 that describes a phone powering process after call detection.

While the previous discussion of the processes and apparatus of the present invention referred to a battery coupled to a phone, the present invention provides sequential charging for any type of mobile station. For example, a personal digital assistant having a battery and an extra battery could be sequentially charged with the present invention.

In summary, the battery charger and battery charging processes of the present invention provide sequential charging of individual batteries and phone batteries. The first battery or phone installed in the charger has priority and is charged until fully charged while power is removed from the other charging pocket. If the phone is ever in a call while in the charging pocket, it now has priority and all power is removed from the battery charging pocket.

What is claimed is:

1. A method for sequential charging a battery and a phone-battery combination in a battery charger comprising a battery charging pocket and a phone charging pocket the method comprising:

initializing the charger by applying power to the phone charging pocket and removing power from the battery charging pocket;

polling the battery charging pocket for an indication of battery presence and polling the phone charging pocket for an indication of phone-battery combination presence;

charging the phone battery combination if the phone-battery combination is present, whether the battery is present or not;

providing an indication if the battery is inserted while the phone-battery combination is charging, to indicate that the battery is installed properly;

polling the phone-battery combination for an indication of completed charging;

removing power from the phone charging pocket in response to the indication of completed charging; and performing a battery charging process.

2. The method of claim 1 further comprising:

monitoring, if the if the phone-battery combination is present and being charged, the phone for an incoming call; and if an incoming call is detected;

removing power to the battery; and providing power to the phone battery combination.

3. The method of claim 2, further comprising;

continuing to monitor the call after providing power to the phone battery combination;

detecting the end of the call;

removing power from the phone battery combination;

removing power to the battery; and resuming the battery charging process.

4. A method as in claim 1, wherein polling the battery charging pocket for an indication of battery presence comprises reading an resistance across identification contacts.

5. A battery charger that sequentially charges a batter and a phone-battery combination, the battery charger comprising:

means for determining a high priority batter by selecting phone-battery combination as the high priority battery, if the phone battery combination is present; and by selecting the battery as the high priority battery, if the phone battery combination is not present and the battery is present;

means for determining a subsequent battery in response to which battery of the battery[]an4 the, phone-battery combination was detected in the battery charger subsequent to the high priority battery;

means for applying power to the high priority battery while power is removed from the subsequent battery; and means for removing power from the high priority battery and applying power only to the phone-battery combination when a call is indicated.

* * * * *